Nov. 17, 1936.    W. J. ETTINGER ET AL    2,061,419
TEMPERATURE CONTROL DEVICE
Filed Dec. 31, 1934    2 Sheets-Sheet 1
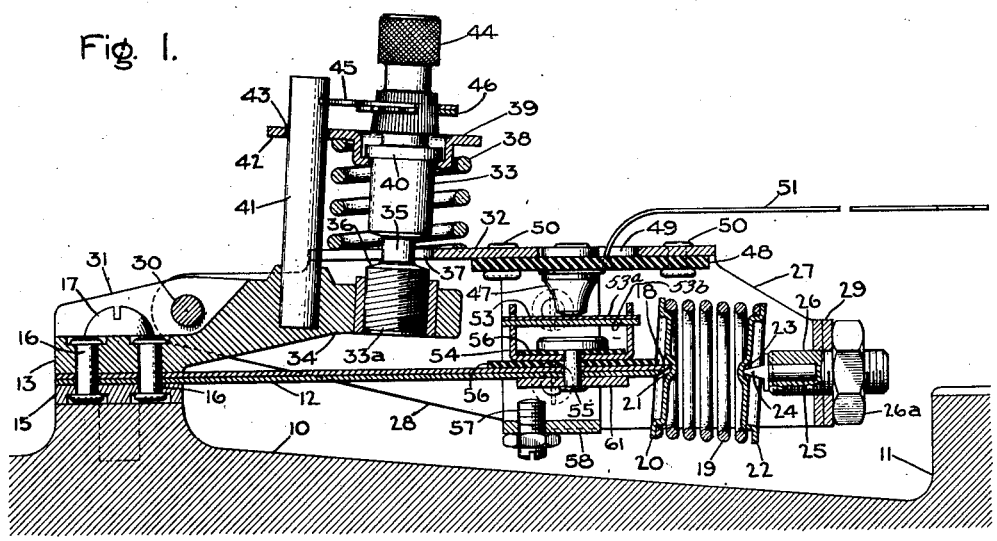
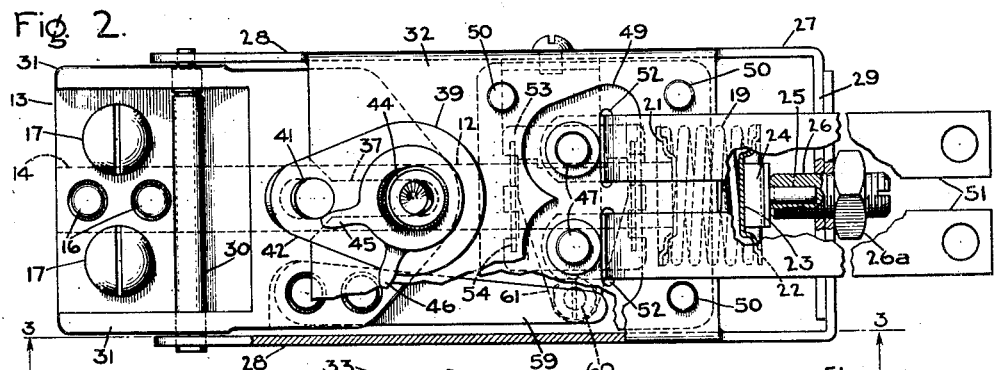
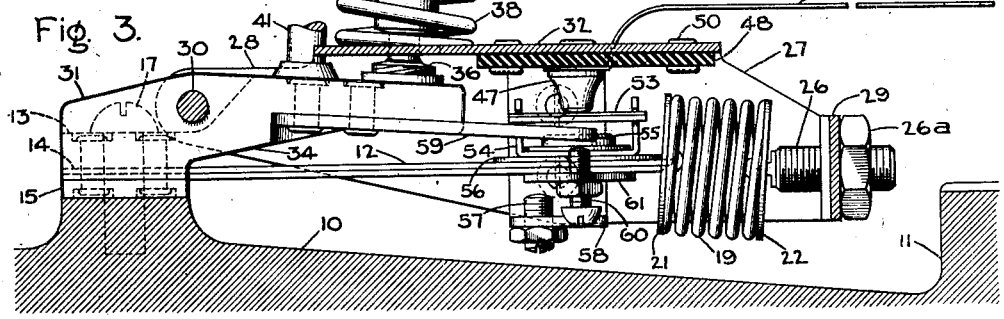
Inventors:
Wallace J. Ettinger,
Nicholas Miller,
by Harry E. Dunham
Their Attorney.

Nov. 17, 1936.  W. J. ETTINGER ET AL  2,061,419
TEMPERATURE CONTROL DEVICE
Filed Dec. 31, 1934   2 Sheets-Sheet 2
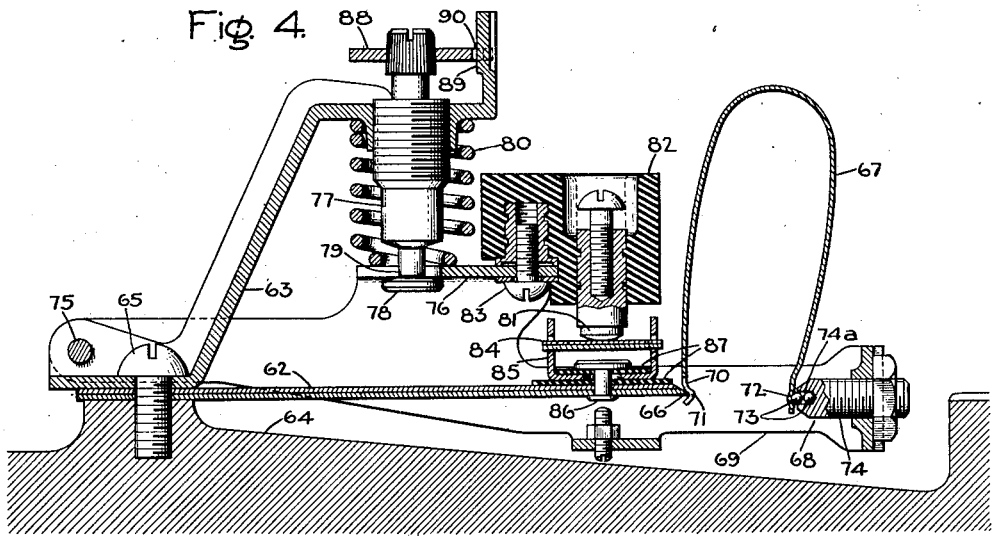
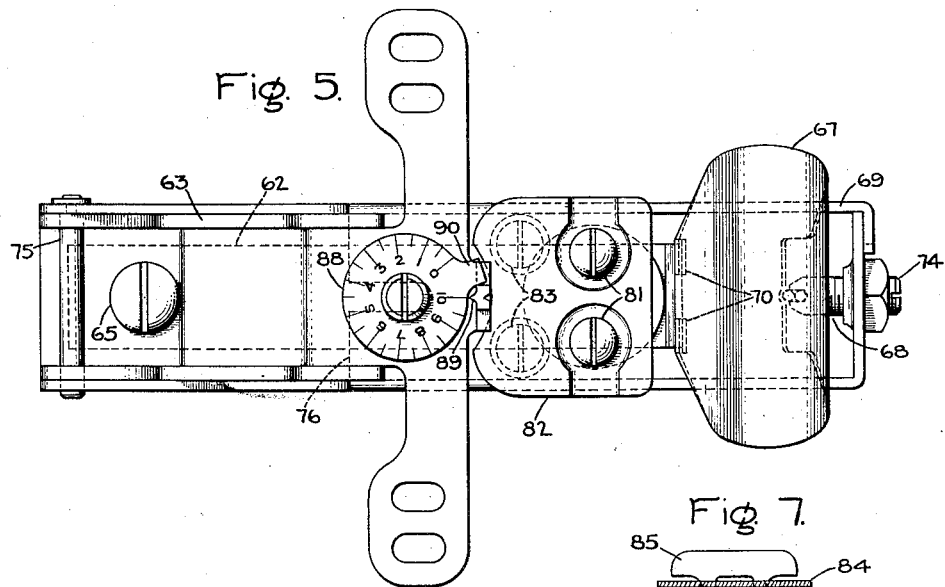
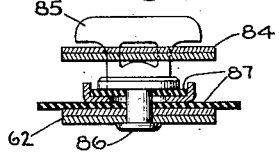
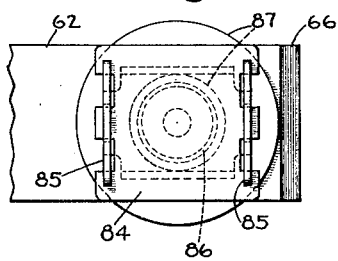
Inventors:
Wallace J. Ettinger,
Nicholas Miller,
by Harry E. Dunham
Their Attorney.

Patented Nov. 17, 1936

2,061,419

UNITED STATES PATENT OFFICE 2,061,419

TEMPERATURE CONTROL DEVICE

Wallace J. Ettinger, Chicago, and Nicholas Miller, La Grange, Ill., assignors to Edison General Electric Appliance Company, Chicago, Ill., a corporation of New York Application December 31, 1934, Serial No. 759,932

8 Claims. (Cl. 200—138)

This invention relates to temperature control devices, more particularly to devices for controlling an electric circuit in accordance with temperature changes, and it has for its object the provision of an improved device of this character.

In general, this invention relates to temperature responsive devices, such as described and claimed in United States reissue patent to A. Lewerenz, No. 16,654, dated June 14, 1927. More specifically, this invention relates to improvements in the temperature control device described and claimed in United States patent to Francis H. McCormick No. 1,977,394, dated October 16, 1934. The temperature control devices disclosed in these patents comprise a bimetallic thermostat bar fixed at one end and having its other end free to move in response to changes in temperature. The movement of the bimetallic bar in response to temperature changes is used to control a suitable switch or other control member. Bearing on the movable end of the bimetallic bar is an elastic member arranged to cause the bar to move quickly from one position to another and thereby give the switch a snap action in opening and closing the circuit which it controls.

In the above-mentioned McCormick patent, means are provided for adjusting the temperature setting of the device by adjusting the relative position of the thermostat bar and the elastic member which bears on the movable end of the bar.

This invention contemplates the provision of a thermostat provided with improved temperature adjusting means of this character.

Another aspect of this invention is the provision of a new organization in a temperature control device of this type including the provision of improved means for adjusting the relative position of the thermostat bar and the spring which bears upon it.

Still another aspect of this invention is the provision of improved means providing an "off" position of the thermostat, that is, a position of the thermostat wherein the switch associated with it is held in its open position.

In accordance with this invention, the bimetallic bar in one form is secured to a heat conducting supporting member which is adapted to be clamped or secured directly in thermal relation with the heated body or device whose temperature is to be controlled. In another form, the bimetallic bar is secured to a member which has a low heat conductivity and arranged so that the bar can be clamped directly to the heated body whose temperature is to be controlled. Mounted upon the supporting member is a suitable support for the spring which bears on the movable end of the thermostat bar to cause it to move quickly from one position to another. This support for the spring is pivotally mounted to the supporting member whereby it can be adjusted on the supporting member to adjust the position of the spring relative to the thermostatic bar. The support for the spring in one form of this invention is in the form of a yoke embracing the thermostat bar. This yoke is provided with a bearing for the spring positioned on the yoke opposite the free end of the bimetallic bar. An adjusting screw is threaded into the supporting member and is connected with the yoke so that the position of the yoke is determined by the adjustment of the screw.

In one form of this invention, the yoke carries a suitable switch contact with which a contact carried by the bimetallic bar cooperates. A suitable spring is interposed between the adjusting screw and the yoke providing for movement of the yoke relative to the adjusting screw, when the switch contacts are closed and when the bimetallic thermostat bar has a predetermined temperature condition so as to obviate the setting up of excessive stresses in the bar.

An "off" position of the temperature control device is effected by means of a stop arranged to engage the thermostatic bar when the adjusting screw has been operated to effect a predetermined low temperature setting of the control device.

For a more complete understanding of this invention, reference should be had to the accompanying drawings, in which Fig. 1 is a vertical elevation mainly in section of a temperature control device embodying this invention; Fig. 2 is a plan view of the temperature control device shown in Fig. 1, portions being broken away and parts shown in section so as to illustrate certain details of construction; Fig. 3 is a vertical sectional view taken through the line 3—3 of Fig. 2; Fig. 4 is a vertical elevation mainly in section illustrating a modified form of this invention; Fig. 5 is a plan view of the temperature control device shown in Fig. 4; Fig. 6 is a plan view of a portion of the temperature control device of Figs. 4 and 5; and Fig. 7 is a sectional view taken through the portion of the control device shown in Fig. 6.

Referring more particularly to Figs. 1, 2 and 3 of the drawings, this invention has been shown in one form as applied to a temperature responsive device intended to be used to control the energizing circuit of an electrically heated device, such as a flatiron. It is to be understood, however, that this invention is not limited to this application, but has general application. In Figs. 1, 2 and 3, the body member 10 is part of the sole plate of an electrically heated flatiron, the details of which have not been illustrated, since they form no part of this invention. In the upper portion of the body member 10 is a recess 11 in which is secured a temperature responsive control device arranged in accordance with this invention to control the heating circuit of the iron with which the control device is associated. As shown, the temperature control device comprises a suitable thermostat, shown as a bimetallic bar 12 made of two strips of metal having dissimilar temperature coefficients of expansion, such as invar and steel, the strips being securely brazed or welded together lengthwise.

The thermostatic bar 12 is rigidly secured at one end to a supporting base or frame 13. The base or frame 13 is provided with a recess 14 which receives the thermostatic bar, and the bar is clamped between the base 13 and a plate 15 by means of a pair of rivets 16, which, as shown more clearly in Fig. 1, are passed through apertures provided for them in the bimetallic bar 12, the support 13, and the clamping plate 15. The supporting plate 13 with the thermostatic bar 12 rigidly secured thereto is adapted to be clamped in direct thermal relation with the heated body 10. For this purpose, the supporting plate 13 and the clamping plate 15 are provided with a pair of apertures on opposite sides of the channel 14 receiving the thermostat, and through these apertures are directed a pair of clamping studs 17, which are arranged to be received in threaded relation with the body 10. It will be observed in view of this arrangement that the thermostatic bar 12 is clamped in direct thermal relation with the body 10 so that heat is conducted to it directly from the body. It will also be observed that the thermostatic bar is supported in the recess 11 in close thermal relation with the working body of the iron.

The end of the thermostat opposite to that secured to the plate 13 is free to move laterally in response to changes in temperature. This free or movable end of the thermostatic bar is provided with a knife-edge bearing 18 on which a suitable compression spring 19 is arranged to bear. As shown, the spring 19 bears directly on a collar 20 which is provided with a seat 21 to receive the knife-edge bearing 18 on the thermostat bar. The opposite end of the spring 19 rests upon a similar collar 22 which is provided with a bearing seat 23 that receives a knife-edge bearing 24. The bearing 24 is provided with a shank 25 which is circular in cross-section, and which is received in a similarly shaped bore provided for it in an adjusting stud 26. The adjusting stud 26 is secured directly to the yoke 27. It will be observed that the tension in the compression spring 19 can be varied by varying the position of the stud 26 in the yoke 27. The stud 26 is secured in its adjusted position in the yoke by means of the nut 26a.

As shown clearly in Fig. 2, the yoke 27 in plan has a substantially U-shape, the yoke being provided with a pair of arms 28 arranged on opposite sides of the thermostatic bar 12 and an arm 29 connecting the side arms 28, and being arranged to directly support the bearing 24 for the spring 19. The ends of the side arms 28 opposite the arm 29 are pivotally mounted on a pin 30 which in turn is supported in up-right flanges 31 provided on the supporting member 13. The side arms 28 are joined intermediate their ends by means of a top or cover plate 32. Preferably, the side arms 28, the end arm 29, and the top plate 32 will be formed of a single piece of metal.

In view of the foregoing construction, it will be observed that the yoke 27 is pivoted to the supporting plate 13 adjacent the rigid or secured end of the bimetallic bar 12 and that it embraces the bar between its side arms 28 and the end arm 29 connecting the side arms. It will also be noted that the yoke has such a length that a space is provided between the bearing 18 on the bimetallic bar 12 and the bearing 24 carried by the yoke sufficiently great to receive the compression spring 19.

The position of the yoke 27 is adjusted by means of an adjusting screw 33 which is received in threaded engagement by the supporting member 13. This member 13, as shown in the drawings, is provided with a portion 34 extending laterally over the thermostatic bar 12 towards its movable end. The adjusting screw 33, as shown, is provided with a threaded portion 33a at its lower end which is received in this portion of the supporting member. Above the threaded portion 33a there is provided a recess 35 which defines an abutment 36 positioned directly above the threaded portion 33a. The reduced portion 35 of the screw is received in a slot 37 provided for it in the top plate 32 of the yoke, the width of the slot being slightly greater than the diameter of the reduced section 35. The top plate 32 is biased into engagement with the abutment 36 by means of a compression spring 38 which has its lower end bearing on the top plate 32 and its upper end on a suitable stop or abutment 39 mounted on the adjusting screw. As shown, the abutment 39 is formed as a collar surrounding the adjusting screw, and is secured against vertical movement by means of a suitable stop 40 mounted on the screw. The screw 33 is free to turn relative to the collar 39, which is held against rotation with the screw by means of a pin 41 which is rigidly secured in a substantially upright position to the supporting member 13. The collar is provided with an extension 42 in which there is provided an aperture 43 for receiving the pin 41. The upper end of the adjusting screw 33 is provided with a knurled portion 44 which is arranged to receive a suitable knob or adjusting handle (not shown) and which is provided with a knurled aperture to fit the knurled portion 44.

It will be observed that the position of the yoke 27 will be determined by adjusting the position of the screw 33. If it be desired to move the yoke 27 in a clockwise direction, as viewed in Figs. 1 and 3, it is merely necessary to turn the screw 33 inwardly on the supporting member 13. This operation, of course, will lower the abutment 36 so as to allow the top plate 32 to be moved in a clockwise direction by means of the compression spring 38. Adjustment of the screw 33 in the opposite direction, that is away from the supporting plate 13, will move the yoke in a counter-clockwise direction. Suitable stops 45 and 46 are secured to the upper end portion of the adjusting screw and are arranged to engage the pin 41 so as to limit the range of movement of the adjusting screw.

The provision of the abutment 39 movable up and down with the screw as it is adjusted to move the yoke 27 up and down is an important feature in that the spring 38 is compressed to the same degree irrespective of the adjustment of the yoke. Further functions of the spring 38 will be pointed out in greater detail hereinafter.

The yoke 27 carries a pair of spaced contacts 47 which are secured directly to a plate 48 formed of any suitable electrically insulating material, such as mica. The contacts 47 may be in the form of rivets secured to the insulating plate 48, as shown more clearly in Figs. 1 and 2, and their upper ends pass through a suitable aperture 49 provided for them in the top plate 32. The insulating plate 48 is rigidly secured to the top plate by means of rivets 50. A pair of suitable supply terminals or leads 51 are secured to the contacts 47. Preferably, these members will be formed of relatively thin metallic strips, as shown, and preferably they will be directed to the under side of the insulating plate 48 through suitable apertures or slits 52 provided for them in the plate. The portions of the leads 51 beneath the plate 49 are rigidly secured to the contacts 47, as clearly shown in Figs. 1 and 2.

It will be understood that the leads 51 will be connected in the heating circuit of the flatiron in this case. However, it is to be understood that they may be connected in any circuit to be controlled or in a controlling circuit for the circuit to be controlled.

A suitable bridging contact 53 for the contacts 47 is carried by the free end of the bimetallic bar 12. The bridging contact 53 is supported by bracket 54 which in turn is rigidly secured to the bimetallic bar 12 by means of rivets 55. The bracket 54 is electrically insulated from the bar 12 by means of sheets of insulating material 56 formed of any suitable insulating substance, such as mica. The contact 53 is mounted in the bracket 54 for pivotal movement on an axis parallel with the thermostat bar 12. The contact 53, as shown, is provided with a contacting surface 53a formed of a precious metal, such as fine silver, which is secured in any suitable manner to a backing 53b formed of any suitable common metal, such as bronze.

It will be observed that when the bimetallic bar 12 is in its position shown in Figs. 1 and 3, the contact 53 will bridge the fixed contacts 47 so as to complete an electric circuit through the temperature control device. And that when the bimetallic bar 12 is operated to move the bridging contact 53 away from the contacts 47, the electrical circuit through the temperature control device will be interrupted. The bimetallic bar 12 in the specific form of the invention illustrated is so arranged that when the temperature is below a predetermined maximum it will hold the contact 53 in engagement with the contacts 47, whereas when its temperature has been increased to a predetermined maximum, it will operate to move the bridging contact 53 away from fixed contacts 47. A suitable stop member 57 is provided for limiting the movement of the bimetallic bar 12 away from the contacts 47. This stop member, as shown, comprises a stud which is threaded in a suitable supporting bracket 58 which in turn is rigidly secured to one arm 28 of the yoke 27.

It will be understood that the compression spring 19 functions to move the bimetallic bar 12 quickly with a snap action between its switch opening and closing positions. The bearing 24 carried by the yoke 27 lies in the plane of movement of the bimetallic bar 12 in such a position that at a predetermined temperature the knife-edge bearing 18 on the bar 12 will lie in a line passing through the bearing 24 to the point of support of the bar 12. This position is known as the "neutral" position of the thermostatic bar. The compression spring 19 exerts a force on the movable end of the thermostatic bar 12 which tends to hold the movable end of the bar on one side or the other of this neutral position. When the bar is substantially in the neutral position, the entire force exerted by the spring member is in the direction of the point of support of the thermostat, and consequently, in this position the spring exerts substantially no force on the bar tending to move it to one or the other of its controlling positions. However, when the thermostat moves from the neutral position in either direction, a lateral component of the spring pressure is produced tending to force the thermostat away from the neutral position. It is this action of the spring member 19 that causes the thermostat bar to move quickly with a snap action between its controlling positions.

In the operation of the control device, as shown in Figs. 1, 2 and 3, it will be understood that the movable contact 53 will be held upward against the contact 47 to maintain the heating circuit of the heating device closed as long as the temperature is below a predetermined maximum. Under these conditions, the movable end of the thermostat bar is situated above the neutral position. As the temperature increases the distortion of the thermostat bar tends to move its free end downward, but this movement is resisted by the resilient member 19. Upon the occurrence of a predetermined maximum temperature, however, the thermostat has sufficient force to overcome the spring 19 when it starts to move downward. As the thermostat moves downward, the opposing force exerted by the spring 19 decreases whereby the thermostat rapidly accelerates and moves at a high speed through the neutral position to the opposite side thereof where it is urged rapidly downwardly by the increasing lateral component of the force applied by the spring 19. The heating circuit is thus quickly opened, the movable contact 53 being thrown downward to its open circuit position. After the heating circuit has been opened and the temperature of the heating device and consequently that of the thermostat decreases, the distortion of the thermostat tends to move it back to its closed circuit position. Upon the occurrence of a predetermined minimum temperature, the thermostat will snap to its closed circuit position. In this manner the heating circuit is controlled to maintain a predetermined temperature which is a mean between the maximum and minimum temperatures for which the device is set to operate. The range between the maximum and minimum temperatures is adjusted by adjusting the position of the screw 26, as pointed out in greater detail in the above Lewerenz patent.

The control device can be set to maintain a desired predetermined temperature by means of the adjusting screw 33. It will be observed that when the rod 33 is rotated, the position of the yoke 27 and hence the position of the knife-edge bearing 24 is changed. This operation changes the position of the neutral line between the knife-edge bearing 24 and the point of support of the thermostatic bar 12. Thus, the temperature at which the thermostat bar 12 will snap from one position to the other through the neutral line is changed. Consequently, the temperature maintained in the heated body 10 will be changed. To set the device to maintain a higher temperature, the adjusting screw 33 is turned downwardly so as to move the knife-edge support 24 downwardly. Adjustment of the screw 33 in the opposite direction will decrease the temperature setting of the temperature control device.

In order to provide an open position of the switch that is, an "off" position for the control device, a suitable stop 59 is provided. The stop 59, as shown, is in the form of an arm or bar, one end, the left-hand end, as viewed in the figures, of which is rigidly secured to the supporting member 13. The arm is arranged on one side of the thermostat bar, as shown in Fig. 2, and is arranged substantially in parallel relation with the bar. The thermostat bar carries a member 60 which under certain conditions of operation is arranged to engage the stop 59. The member 60, as shown, is mounted in a supporting bracket 61 which in turn is rigidly secured to the end of the thermostat bar 12 by means of the rivet 55. When the adjusting rod 33 is operated to move away from the plate 13 and thereby elevate the yoke 27 to effect lower temperature settings, the thermostat bar 12 of course will be forced to follow the yoke upwardly by the action of the spring 19. When the screw 33 has been moved a predetermined distance from the plate 13, the member 60 carried by the bar 12 will engage the stop 59 carried by the support 15, whereupon if the screw 33 be further adjusted into its low temperature range, the yoke 27 will continue to move upwardly while the thermostat bar 12 will be held stationary by the stop. As a result of this the contacts 47 will be carried away from the bridging contact 53. This constitutes the "off" or open condition of the control device. In order to reclose the switch it is merely necessary to turn the adjusting screw 33 in a direction to increase the temperature setting until the clearance between the contacts 47 and 53 is absorbed, whereupon the switch will be closed.

It will be observed that during the normal operation of the control device, the compression spring 38 holds the yoke 27 against the abutment 36. The spring, however, permits the yoke to move relatively to the adjusting screw under certain conditions of operation. This occurs when the thermostat has been set for a high temperature and is then allowed to cool to room temperature, as, for example, when the iron is detached from its supply source. Under these conditions, when the bar 12 cools, it, of course, causes the bridging contact 53 to bear against the contacts 47 with an increasing force. The stress in the bar, due to this action increases and unless relieved would unduly stress the bar and in certain cases might even produce a permanent set. The spring 38 relieves this excessive stress in the bar by permitting the yoke to move upwardly when the stress in the bar attains a predetermined maximum. The reduced portion 35 provides for movement of the yoke relative to the screw 33.

In the form of this invention shown in Figs. 4 to 7, inclusive, the bimetallic bar 62 has one end rigidly secured, as by welding, to a support 63 and the support and bar are rigidly secured to the body 64 whose temperature is to be controlled by means of a clamping screw 65. In this case, the support 63 is positioned directly above the bimetallic bar 62, which, as shown, bears directly on the heated body 64. The bimetallic bar 62 carries on its free or movable end a knife-edge bearing 66. Bearing on this movable end of the bar is a U-shaped compression spring 67, one arm of which, as shown, rests upon the knife-edge bearing 66 and its other arm upon a bearing 68 carried by a yoke 69. The leg of the U-shaped spring 67 bearing upon the bimetallic bar 62 at its lower end is provided with two spaced feet 70 (Fig. 5) in each of which is provided a bearing seat 71. The other leg of the spring 67 is provided with a seat 72 in which is received a ball bearing 73 that is carried by a stud 74. This stud 74 is rigidly supported by the yoke 69. Preferably, the stud will be provided with a bore 74a for receiving the ball, and preferably and as shown, two balls 73 will be positioned in the bore and arranged so that the outer ball supports the spring 67 clear of the stud. The ball bearing decreases friction between the spring 67 and the supporting stud 74.

The yoke 69 has in general the same shape as has the yoke 27 of the first form described, and is pivotally mounted to the supporting bracket 63 by means of a pin 75. The upper plate 76 of the yoke is secured to an adjusting screw 77 which has threaded engagement with the support 63, as shown in Fig. 4. The adjusting screw 77 at its lower end is provided with an abutment 78 above which is provided a reduced portion 79 that receives the top plate 76. The top plate 76 is biased into engagement with the abutment 78 by means of a compression spring 80 that has its lower end bearing on the top and its other end bearing against the supporting bracket 63.

The top plate 76 carries a pair of spaced contacts 81 which are supported directly by means of an insulating member 82, formed of any suitable electrically insulating material. This member in turn is rigidly secured to the top plate 76 by means of screws 83. Cooperating with the spaced contacts 81 is a bridging contact 84 carried by the movable end of the bimetallic bar 62. The bridging contact 84 is similar in construction to the bridging contact 53 of the first form. The contact 84 is carried by a U-shaped bracket 85 which is secured to the end of the bimetallic bar by means of a rivet 86. This bracket is insulated from the bimetallic bar by insulating sheets 87. The contact 84 can rotate in the bracket 85 to a limited extent on an axis parallel with the bar 62.

On the upper end of the adjusting screw 77 is provided an indicating dial 88 which cooperates with a fixed index 89 carried by the support 63 to assist in adjusting the temperature of the control device. A suitable stop 90 provided on this dial is arranged to engage the indicator or fixed index 89 so as to limit the range of movement of the adjusting screw.

This device operates in the same fashion as the control device shown in Figs. 1, 2 and 3. It is believed to be unnecessary to describe in detail the operation of the second form. Briefly, the bimetallic bar 62 is moved between its controlling positions with a snap action by the operation of the spring 67. The temperature setting of the device is effected by adjusting the position of the yoke 69, which as previously described, changes the neutral position of the thermostat. The spring 80 functions to prevent undue stress in the bimetallic bar in substantially the same manner as does the spring 38 of the first form.

An important feature of this invention is the organization wherein all the elements of the control device are supported on a single supporting member 13 (Figs. 1–3), 63 (Figs. 4 and 5), and the whole being arranged to be applied to an appliance by simple clamping screws. In each form, the bimetallic bar is supported in intimate thermal relation with the heated body whose temperature is to be controlled. In the second form where the support 63 is above the thermostat it is preferable to form the support of a metal having a relatively low heat conductivity.

While we have shown particular embodiments of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States, is:—

1. A temperature control device comprising a thermostat, an elastic member arranged to cause said thermostat to move quickly from one position to another, a support for said elastic member, means for varying the position of said support so as to adjust the temperature setting of said device, a stop carried by said support against which said thermostat bears when it has a predetermined temperature condition and means yieldingly holding said support against the force of said thermostat arranged to permit movement of said support by said thermostat when the force exerted by said thermostat on said stop attains a predetermined maximum.

2. A temperature control device comprising a thermostat bar having one end fixed and its other end free to move in response to changes in temperature, a spring having one end bearing on said bar and movable with said bar in its plane of movement so as to cause said bar to move quickly from one position to another, a support for the other end of said spring, a substantially rigid pivoted lever carrying said support for movement in said plane of movement of said thermostatic bar, an adjusting screw connected with said lever for shifting its position in said plane of movement, a stop carried by said lever against which said thermostat bar rests when it has a predetermined temperature condition and a spring between said adjusting screw and said lever providing for movement of said lever relative to said screw by said thermostat bar under predetermined temperature conditions of said bar.

3. A temperature control device comprising a thermostat bar having one end fixed and its other end free to move in response to changes in temperature, a spring having one end bearing on said bar and movable with said bar in its plane of movement so as to cause said bar to move quickly from one position to another, a support for the other end of said spring, a substantially rigid pivoted member carrying said support for movement in said plane of movement of said thermostat bar, an adjusting screw having an abutment thereon arranged to engage said pivoted member to shift its position in one direction in said plane of movement, a spring carried by said adjusting screw bearing on said lever to hold it against said abutment so as to move said lever in the opposite direction when said abutment is moved in said opposite direction by said adjusting screw, a switch contact carried by said lever, a switch contact carried by said thermostat bar engaging said contact on said lever when said thermostat bar has a temperature below a predetermined maximum so as to tend to move said lever in said one direction, said spring carried by said screw permitting said lever to be moved by said thermostat bar in said one direction when the forces set up in said bar urging said switch contacts together exceed a predetermined maximum, and a stop carried by said lever arranged to engage said thermostat bar to limit its movement away from said contact on said lever.

4. A temperature control device comprising a heat conducting supporting member adapted to be clamped in direct thermal relation with a body to be heated, a bimetallic thermostat bar having one end rigidly secured to said supporting member and its other end extending laterally therefrom and free to move in response to changes in temperature, a rigid yoke pivotally secured to said supporting member adjacent the fixed end of said thermostat bar for movement in the plane of movement of said bar and having a pair of arms extending laterally from said member on opposite sides of said bar with their ends extending beyond the end of said bar and a third arm connecting the extending ends of said pair of arms beyond the end of said bar, a compression spring interposed between the end of said bar and said third arm, a top plate overlying said bar connecting said pair of arms at the sides, an adjusting screw passed through an aperture provided for it in said top plate and received in threaded engagement in said supporting member, an abutment on said screw bearing on the underside of said top plate, a second abutment on said screw spaced from the upper surface of said top plate and a compression spring interposed between said second abutment and said top plate.

5. A temperature control device comprising a thermostat bar having one end fixed and its other end free to move in response to changes in temperature, a spring having one end bearing on said bar and movable with said bar in its plane of movement so as to cause said bar to move quickly from one position to another, a support for the other end of said spring, a substantially rigid pivoted member carrying said support for movement in said plane of movement of said thermostat bar, an adjusting screw having an abutment thereon arranged to engage said pivoted member to shift its position in one direction in said plane of movement when said screw is turned in one direction, a second abutment fixed on said screw so as to move with it when said screw is adjusted, and a spring between said second abutment and said member biasing said member into engagement with said first abutment, the tension in said spring remaining unchanged when said screw is turned to adjust the position of said member.

6. A temperature control device comprising a thermostat bar, a switch operated by said thermostat bar related to said bar so that when said bar is cooled to a temperature below a predetermined value said bar operates to close said switch, a spring acting on said thermostat bar so as to move said switch quickly from its closed to its open position and from its open to its closed position depending upon the relative position of said thermostat bar and said spring, adjusting means for adjusting the relative position of said thermostat bar and spring in one direction so as to increase the temperature setting of said device and in the opposite direction to decrease the temperature setting of said device and a stop for engaging said thermostat bar when said relative position has been adjusted in said opposite direction a predetermined amount to prevent further movement of said bar so that said switch is opened by further adjustment in the relative position of said bar and spring in said opposite direction.

7. A temperature control device comprising a thermostat, a U-shaped spring having a pair of spaced apart feet on one leg bearing on said thermostat, and a bearing for the other leg of said spring comprising a support, a ball bearing carried by said support and a seat in said other leg receiving said ball bearing.

8. A temperature control device comprising a thermostat bar having one end free to move in response to changes in temperature, a spring having one end bearing on said free end and movable with said bar in its plane of movement so as to cause said bar to move quickly from one position to another, a support for the other end of said spring, a pivoted member carrying said support for movement in said plane of movement of said thermostat bar, an adjusting screw having an abutment thereon arranged to engage said pivoted member to shift its position in one direction in said plane of movement when said screw is turned in one direction, a second abutment fixed on said screw so as to move with it when said screw is adjusted, and a spring between said second abutment and said member biasing said member into engagement with said first abutment, the tension in said spring remaining unchanged when said screw is turned to adjust the position of said member.

WALLACE J. ETTINGER.
NICHOLAS MILLER.